July 8, 1930.  W. I. BETTIS  1,770,123

PISTON CONSTRUCTION

Filed June 5, 1929

Inventor:
William I. Bettis,
per Arthur J. Farnsworth.
Attorney.

Patented July 8, 1930

1,770,123

UNITED STATES PATENT OFFICE

WILLIAM I. BETTIS, OF LOS ANGELES, CALIFORNIA

PISTON CONSTRUCTION

Application filed June 5, 1929. Serial No. 368,666.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates in general to piston construction, and particularly to pistons adapted for use in slush pumps. Among its principal objects are; first, to provide an improved piston construction that will remain tight in slush pump service, for relatively long periods of time; second, to provide improved means for packing pistons employed in such service; and, third, to accomplish the above, and other objects that will appear in the following description, in a very simple and relatively inexpensive manner.

My objects are attained by means of the construction illustrated typically in the accompanying drawings, in which—

Figure 1:
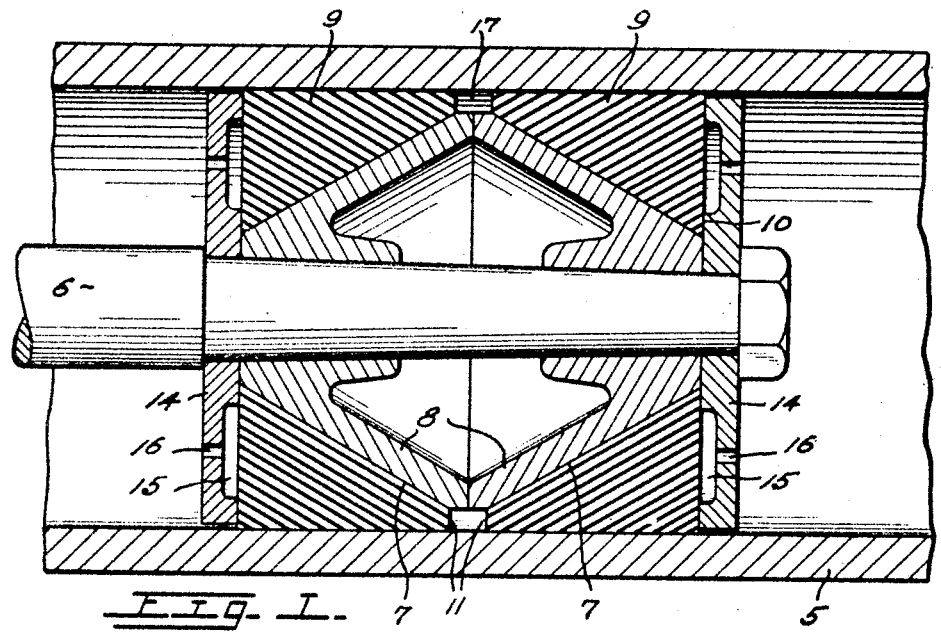
Figure 2:
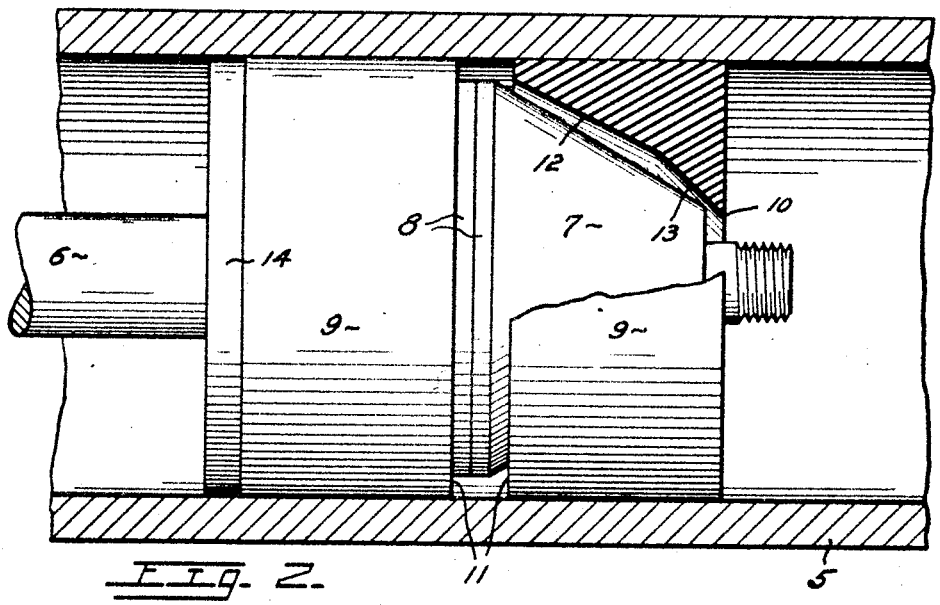

Figure 1 is a longitudinal section of cylinder, and of a piston therein that embodies the elements of my invention; and Figure 2 is a similar view of a cylinder with the above mentioned piston shown in elevation and only partially assembled, one of the packing sleeves being shown broken and partially in cross-section for convenience of disclosure.

Similar reference numerals refer to similar parts throughout both views.

In a companion application for piston construction, filed May 15, 1929, Serial #363,281, I disclosed a piston having certain features in common with that of the present invention. The latter however embodies additional inventive features, and the claims of the two applications are directed to independent inventions and do not conflict.

It is well known in the art that certain yieldable materials, of which rubber is one, are especially suited for packing purposes in slush pump service. Such yieldable packings however, must be properly confined, and should be so designed that they are tightest in service at the points where the greatest fluid pressures occur. Otherwise, particularly in such duty as that mentioned, foreign particles of abrasive material may be picked up and retained by the packing, with resulting abrasion or scoring of the cylinder walls. The present invention discloses a construction that is admirably adapted for securing full advantage of yieldable packings in such a manner as to resist wear upon either the packing or cylinder walls for relatively long periods of time. Although it is particularly adapted to the use of relatively soft rubber packings, it is not confined to the employment of such material for this purpose, and other suitable yieldable materials may be employed in place of rubber, whenever this is found to be desirable.

In the drawings a longitudinal section of a pump cylinder is shown at 5. Within this is a pump rod 6, carrying a piston head having two conical exterior surfaces 7, co-axial therewith and tapering toward its respective ends. In the specific form illustrated, the piston head is shown as comprising two hollow cones 8 placed on the piston rod base to base, this being a convenient expedient for reducing its weight and for saving a corresponding amount of material.

Surrounding each of the conical surfaces of the head is a cylindrical packing sleeve 9, of suitable yieldable material such as rubber. The bores of these sleeves, before being assembled on the piston head, are concavely tapered, and the smaller diameter of the bore of the sleeves at 10, is less than that of the diameter of the corresponding portion of conical surfaces 7 upon which they are to seat. Thus, when the sleeves are forced upon the respective conical surfaces of the head, their outer ends will be subjected to greater radial compression than their remaining portions, and they will fit both the piston head and the cylinder wall most tightly at their outer ends. The diameter of the bores of the sleeves at their inner faces at 11, is usually made only slightly, if any, less than the corresponding diameter of the conical surfaces of the heads. Intermediate diameters of the sleeve bores, for a portion of their axial lengths, are made greater, by means of their concave tapering, than the corresponding diameters of the head surfaces upon which they are to seat. This is to provide space whereinto the yieldable material of the sleeves may be distorted, when radial compressive stresses are imposed upon the sleeves at their ends when the piston head is forced into their bores. This provision is made for the well known reason that, although rubber and similar non-porous materials are readily distortable, they are nevertheless substantially incompressible. If therefore they are to be distorted, space must be provided for allowing such distortion to take place.

One way of making the concaved conical bore of the sleeves is illustrated in Fig. 2, wherein the right hand sleeve 9 is shown before it is forced upon the corresponding conical surface 7 of the head. It will be noted that the bore of the sleeve illustrated in this figure comprises two portions, of which the inner part 12 is tapered somewhat less than the slope of conical surface 7, and the outer portion 13 is tapered somewhat more. Obviously substantially the same result can be had by using a spherically concaved bore, instead of the two differently tapered straight bore portions illustrated. In either case the least diameter of the sleeve bores occurs at their outer faces 10, and this is, as stated above, materially less than that of the corresponding portion of the conical surfaces 7 upon which they are to seat.

A follower plate 14 is provided at each end of the piston, to retain the packing sleeves in place when assembled. These follower plates are provided with annular grooves 15 on their inner faces, and a plurality of small orifices 16 establish communication between said grooves and the outer faces of the completed piston. Thus the fluid pressures within the cylinder are permitted to act directly upon the outer faces of the packing sleeves, and will tend to distort the material of the sleeves in such a way as to further compress the yieldable packing material against the cylinder walls and the outer portion of conical surfaces 7.

I prefer to form my packing sleeves of such a length that their inner faces 11 will not abut. This will provide an intermediate circumferential groove 17 in the completed piston, for the retention of fluid that acts as a further aid in making the piston tight in service; such entrapped fluid being always under a pressure that is intermediate between that in the two ends of the cylinder.

I have above described my invention generically, and specifically as to certain features. It will be obvious to those skilled in the art that other specific variations may be employed without departing from its essence.

I claim as my invention:

1. Piston construction comprising; a piston head having a tapered peripheral surface co-axial therewith; and a taper-bored cylindrical sleeve of yieldable material surrounding said surface and seated thereupon; the bore of said sleeve being such that the entrance of the piston head thereinto will cause said material to be radially compressed; and said compression being greatest at the smaller extremity of the bore.

2. Piston construction comprising; a piston head having a conical peripheral surface co-axial therewith; and a conically-bored cylindrical sleeve of yieldable material surrounding said surface and seated thereupon; the taper of said bore adjacent its smaller extremity being greater than that of said peripheral surface; the proportions of the bore being such that the entrance of the piston head thereinto will cause said material to be radially compresesd; and said compression being greatest at said extremity.

3. Piston construction comprising; a piston head having a conical peripheral surface co-axial therewith; and a concavely tapered cylindrical sleeve of yieldable material surrounding said surface and seated thereupon; the diameter of the smaller extremity of said bore before assembly being less than that part of said peripheral surface upon which it is to be seated; said bore being so proportioned that the entrance of the piston head thereinto will cause said material to be radially compressed; and said compression being greatest at said extremity.

4. Piston construction comprising; a piston head having a tapered peripheral surface co-axial therewith; and a taper-bored cylindrical sleeve of yieldable material surrounding said surface and seated thereupon; the bore of said sleeve at its extremities being less before assembly than the diameter of the corresponding portions of said surface upon which it is to be seated; the proportions of the bore being such that the entrance of the piston head thereinto will cause said material to be radially compressed; and said compression being greatest at the smaller extremity of the bore, and least at intermediate portions.

5. Piston construction comprising; a piston head having co-axial peripheral surfaces tapered toward its respective ends; and a taper-bored cylindrical sleeve of yieldable material surrounding each of said surfaces and seated thereupon; the bores of said sleeves before assembly being less than the diameters of the corresponding portions of said surfaces upon which they are to be seated; the proportions of the bores being such that the entrance of the tapered portions of the piston head thereinto will cause said material to be radially compressed; and said compressions being greatest at the smaller extremities of the bores, and least at their intermediate portions.

WILLIAM I. BETTIS.